United States Patent
Lotz

(10) Patent No.: US 6,367,718 B1
(45) Date of Patent: Apr. 9, 2002

(54) STEEL STRAND CASTING INSTALLATION WITH TORCH CUTTING MACHINE THAT GRANULATES SAFELY AND ECONOMICALLY AND WATER CLEANSES EXHAUST GASES

(75) Inventor: Horst K. Lotz, Hofheim-Wallau (DE)

(73) Assignee: Gega Corporation, Pittsburgh, PA (US)

( * ) Notice: Subject to any disclaimer, the term of this patent is extended or adjusted under 35 U.S.C. 154(b) by 0 days.

(21) Appl. No.: 09/573,579

(22) Filed: May 18, 2000

(30) Foreign Application Priority Data

May 21, 1999 (EP) .............................. 99109990

(51) Int. Cl.⁷ ................................ B05B 1/14
(52) U.S. Cl. ................ 239/556; 239/548; 239/562; 239/568; 239/553.5
(58) Field of Search ................ 239/548, 550, 239/551, 554, 556, 562, 568, 560, 597, 598, 599, 561, 553.5; 72/201; 148/9, 74, 197; 266/48, 49, 50, 52, 65, 66

(56) References Cited

U.S. PATENT DOCUMENTS

| | | | | |
|---|---|---|---|---|
| 3,447,756 A | * | 6/1969 | Lawrence, Jr. | 239/568 |
| 3,743,259 A | * | 7/1973 | Hennelly | 266/49 |
| 3,771,730 A | * | 11/1973 | Nicoloff et al. | 239/568 |
| 3,934,641 A | * | 1/1976 | Chielens | 239/428 |
| 4,336,078 A | * | 6/1982 | Radtke | 266/49 |
| 5,212,975 A | * | 5/1993 | Ginzburg | 239/562 |

* cited by examiner

Primary Examiner—James Hook
Assistant Examiner—Dinh Q. Nguyen
(74) Attorney, Agent, or Firm—Brij K. Agarwal; Eckert Seamans Cherin & Mellott, LLC

(57) ABSTRACT

A unilateral or bilateral device which granulates torch cutting slag underneath the material and underneath the cutting torches (2), while synchronizing with the torch cutting machine (1), which is equipped with new nozzle assemblies slightly tilted outwards, the nozzle assemblies being arranged in a new way with shroud-spraying nozzles (11) and new jet-spraying nozzles (10) at low, work specific inlet pressures and a comparably low requirement of water. Very good granulation results with regard to the torch cutting slag produced during the torch cutting procedure. At the same time the nearby components are protected from slag fouling, the slag can be removed without any problems, and exhaust gases can be purified owing to the floating particles being washed out therefrom.

19 Claims, 8 Drawing Sheets

STEEL STRAND CASTING INSTALLATION WITH TORCH CUTTING MACHINE THAT GRANULATES SAFELY AND ECONOMICALLY AND WATER CLEANSES EXHAUST GASES

TECHNICAL FIELD

The present invention relates generally to steel casting equipment and, more particularly, to equipment employed in cutting continuous steel strands from a casting operation into usable lengths. Specifically, the invention relates to a nozzle assembly that granulates slag resulting from a torch cutting machine that cuts a continuous steel strand.

BRIEF DESCRIPTION OF THE DRAWINGS

The preferred embodiments of the invention, illustrative of the best modes in which Applicant has contemplated applying the principles of the invention, are set forth in the following description and are shown in the drawings and are particularly and distinctly pointed out and set forth in the appended claims.

Similar numerals refer to similar parts throughout the specification.

DESCRIPTION OF THE PREFERRED EMBODIMENTS

In steel strand casting installations, the continuously cast strands in billet, bloom or slab format run out via roller tables and are cut or fragmented along a cut line above the roller table spacings by means of oxygen torch cutting machines, which are arranged right above, into reasonably workable piece lengths. In the process, the cutting torches hurl unburned iron particles mixed with slag particles out of the kerf which is produced during the cut. Underneath, deeper, and next to the cut, as a result of the synchronous travel between the strand and the torch cutting machine within an entire area, the slag is sprayed onto parts of the installation, into collecting skips, or into removal channels which contain water. The slag, however, may stick or cake together, which could significantly obstruct its removal or the granulation at a later stage and thus result in high expenses and even operational standstills.

Figure 1:
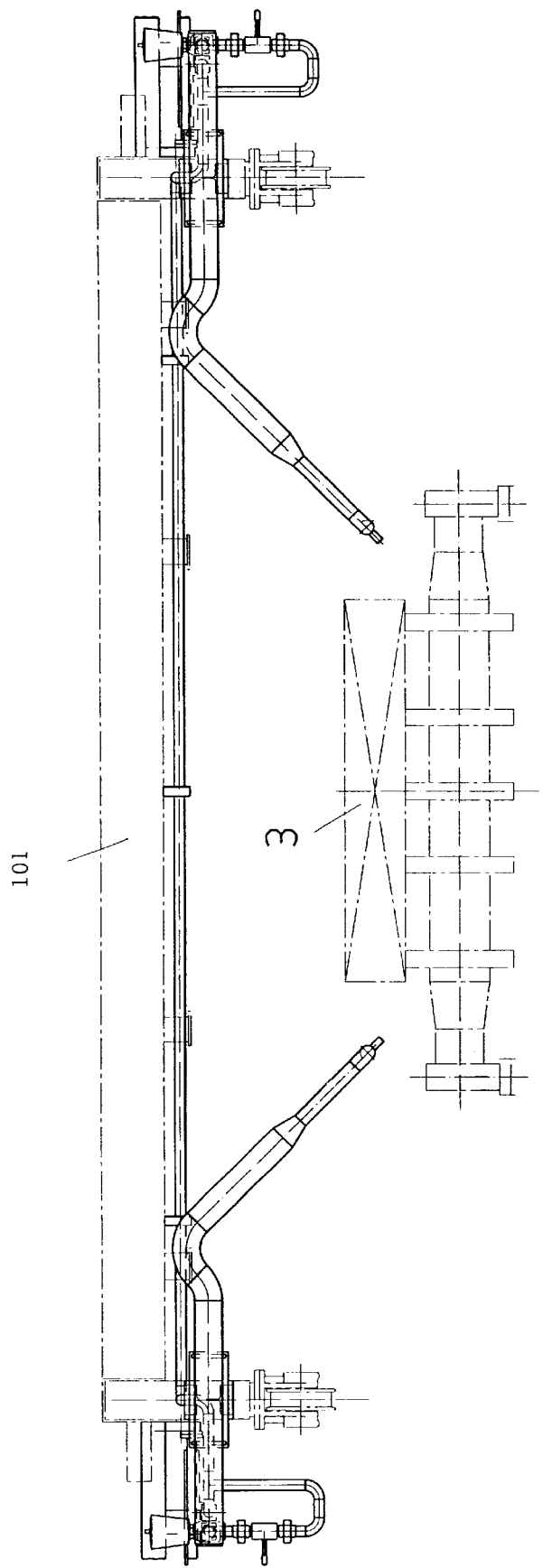
FIG. 1 is a front elevational view of a prior art steel strand torch cutting machine.
Figure 2B:
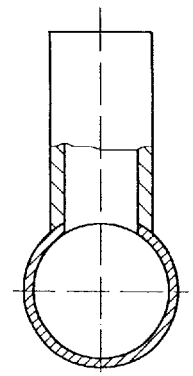
FIG. 2B is a side elevational view of a portion of FIG. 2A.
Figure 2A:
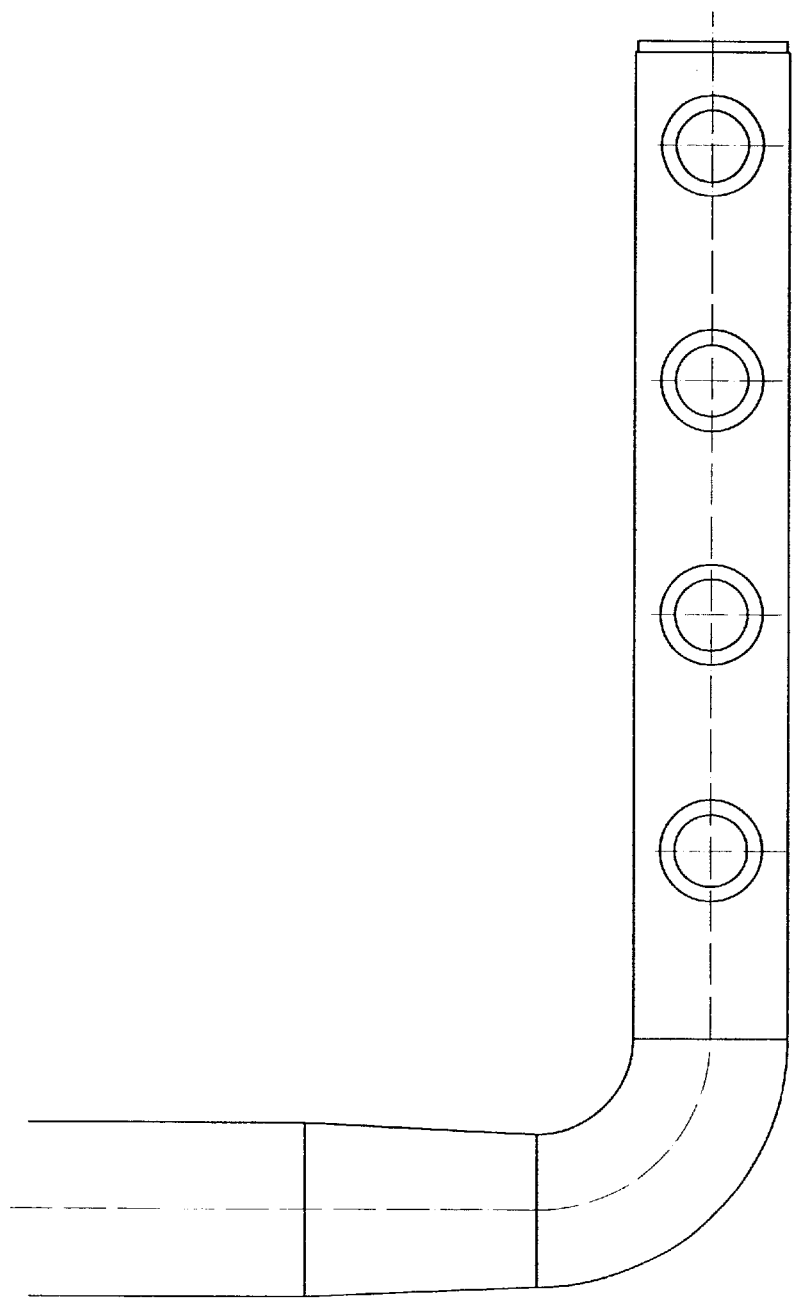
FIG. 2A is a front elevational view of a prior art granulation system.
Figures 2C, 2D:
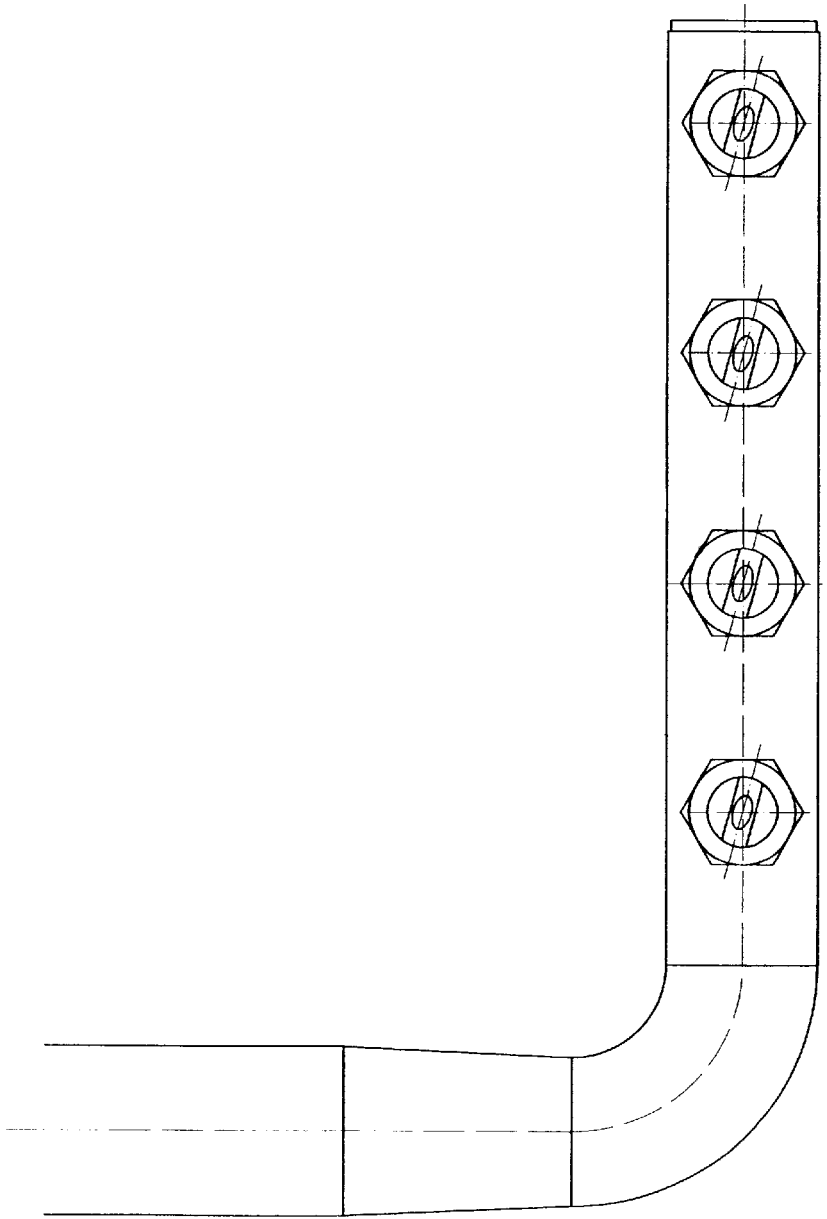
FIG. 2C is a front elevational view of another prior art granulation system.
FIG. 2D is a side elevational view of a portion of FIG. 2C.

Here, the soonest granulation possible, i.e., spraying the slag with water, is the best solution. Therefore, either stationary granulation water nozzles requiring a large amount of water or granulation nozzles moving along with the torch cutting machine (101) as it cuts the strand (3) according to FIG. 1 with unreliably effective water jets sprayed by nozzles according to FIGS. 2A and 2B or with a water shroud sprayed by nozzles according to FIGS. 2C and 2D are used below the torch cut during the cutting process. The red hot liquid slag will either burst through an insufficiently-covering curtain of water or insufficiently-powerful water jets which are not arranged close enough next to each other. This is the result of the round shape of the water jets and their spreading and mutually influencing behavior.

Aggravating this is the fact that the slag does not only burst or spray straight downwards, but sometimes to the sides and backwards in an uncontrolled manner. All previously known designs of synchronization of granulation systems with spraying nozzle arrangement and direction, similar to those depicted in FIG. 1, have tried to prevent the slag from caking together and the consequent formation of skull by using large amounts of water, high water pressures, and many water jets or jets with large diameters. For that purpose, the jets were arranged at sufficiently large spacings horizontally next to each other or in a large semicircle. Furthermore, a row of water jets was arranged "in the gaps" below an upper row of water jets.

When well-known only partly effective granulation systems are used for broader pieces such as slabs, the effectiveness of the jets diminishes with the width. In systems with granulation nozzles on both sides moving inwards and towards each other, the spreading jets sometimes collide and therefore become ineffective.

Moreover, a favorable effect on the exhaust gases produced during the torch cut by means of the support of an exhaust system or by means of washing fine floating particles out of the exhaust gas can hardly or not at all be observed.

The subject matter of the invention described hereinafter is a nozzle assembly (9) designed with a certain number and certain shapes and sizes of specially arranged jet-spraying nozzles (10) and shroud-spraying nozzles (11) for a specific pressure in the range of 3–9 bar and an economical consumption of water in the range of 30–60 cubic meters per hour. Owing to the small cross-sectional dimension of the entire set of water jets, a slightly interlaced, therefore parallel and effective, spraying of two nozzle assemblies towards each other for broader pieces is possible. Furthermore, the generated exhaust gas flowing with the cutting jet is discernibly purified when the floating particles are washed out.

Figure 3B:
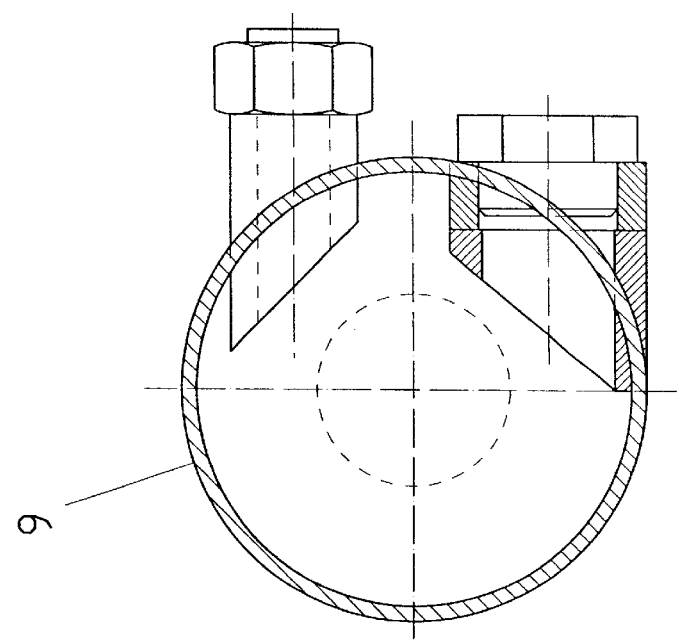
FIG. 3B is a side elevational view of FIG. 3A.
Figure 3A:
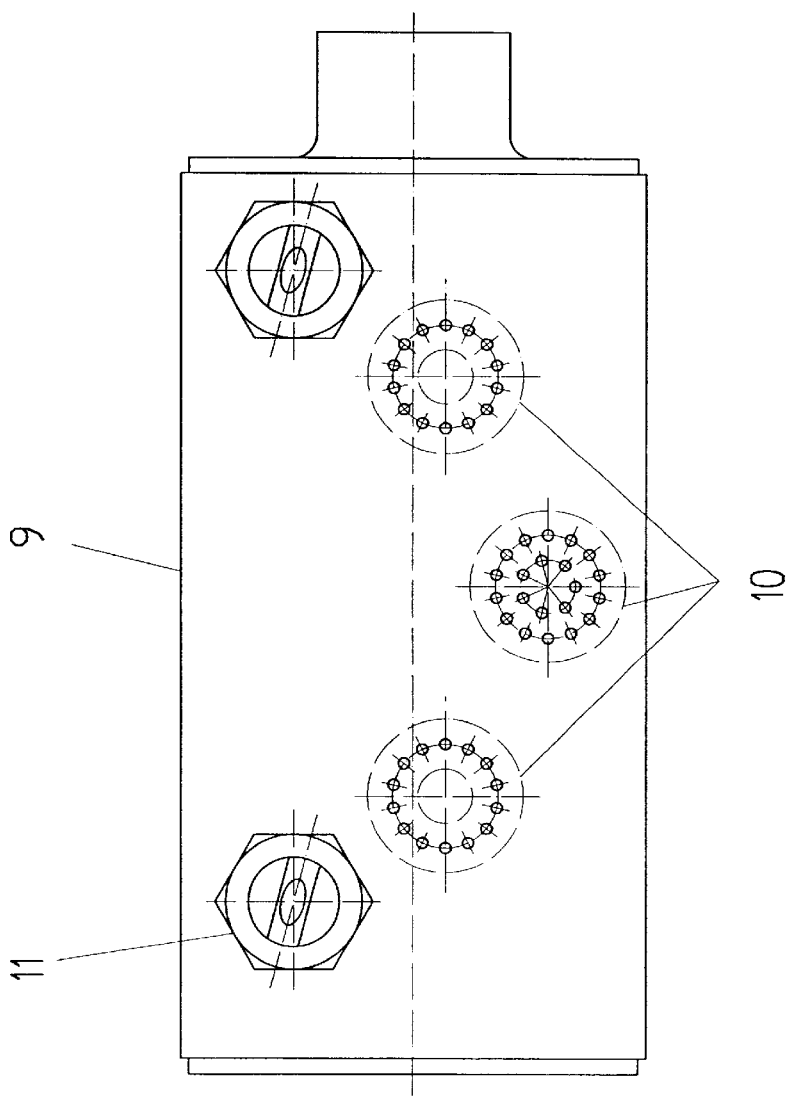
FIG. 3A is a front elevational view of a first embodiment of a nozzle assembly in accordance with the present invention.

As depicted in FIGS. 3A and 3B, a first embodiment of a new type of nozzle assembly (9) with a multiple V-shaped arrangement of jet-spraying nozzles (10) and shroud-spraying nozzles (11) screwed into or otherwise mounted on a nozzle body is used: three jet-spraying nozzles (10) arranged in the shape a V, of which the bottom jet spraying nozzle (10) (FIGS. 5A and 5B) sprays especially powerfully and consumes more water than the other two jet-spraying nozzles (10) (FIGS. 4A and 4B), which are located higher and on the sides. The narrowest central distances between the jet-spraying nozzles (10) and shroud-spraying nozzles (11) is preferably in the range of 30–60 millimeters.

The jet-spraying nozzles (10) are not designed as full-jet nozzles with one spraying hole, but as multiple-jet nozzles as depicted in FIGS. 4A, 4B, 5A, and 5B. The jet spraying nozzles (10) have smaller, annular arranged spraying holes which, just like a hollow spraying nozzle with little water requirement, cover a large area that also widens from the nozzle outlet onwards and reach comparably far. The bottom jet-spraying nozzle (10) in the center (shown also in FIG. 5A and 5B) is located directly below a usually vertically directed stream of slag. The centerdisposed bottom jet-spraying nozzle (10) (FIGS. 5A and 5B) is equipped with two rings of spraying holes. One shroud-spraying nozzle (11) is arranged above each of the jet-spraying nozzles (10) (FIGS. 4A and 4B) extending the V-shape upwards on both sides. Owing to the type of jets, their widening, and their V-shaped arrangement, the emerging slag is either forced to burst through a double-layered water curtain or, if not so, deviate downwards and towards the center as if by means of a water roof and then burst through the reinforced multiple water jet in the center, each of which has a successively and multiple deviating and chilling effect on the slag.

Figure 6:
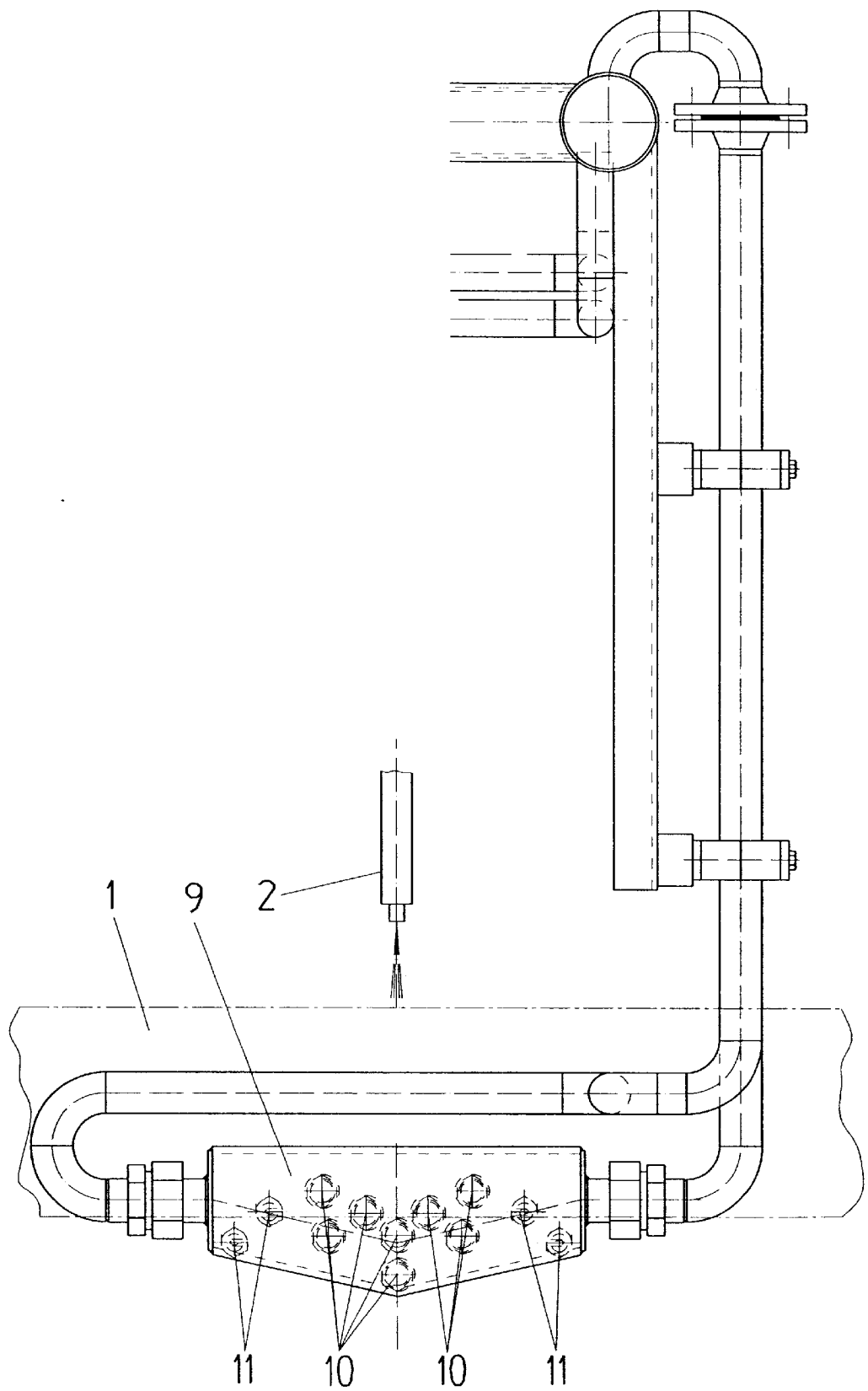
FIG. 6 is a front elevational view of a second embodiment of a nozzle assembly in accordance with the present invention.

FIG. 6 depicts a second embodiment of a nozzle assembly (9), the invention of which also assumes an inverted roof or V-shaped arrangement of the jet-spraying nozzles (10) and the shroud-spraying nozzles (11), with the jet-spraying nozzles (10) and the shroud-spraying nozzles (11) being screwed into or otherwise mounted on a nozzle body.

Figure 4A:
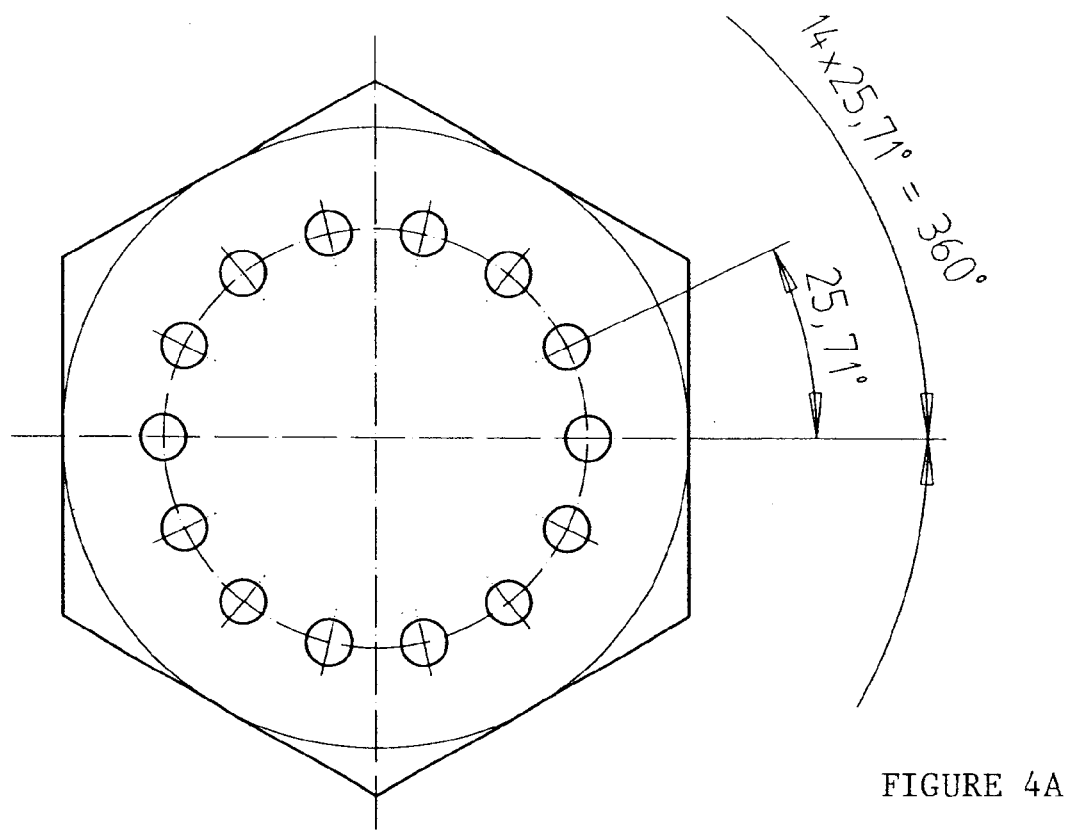
FIG. 4A is a top plan view of a first type of jet-spraying nozzle in accordance with the present invention.
Figure 4B:
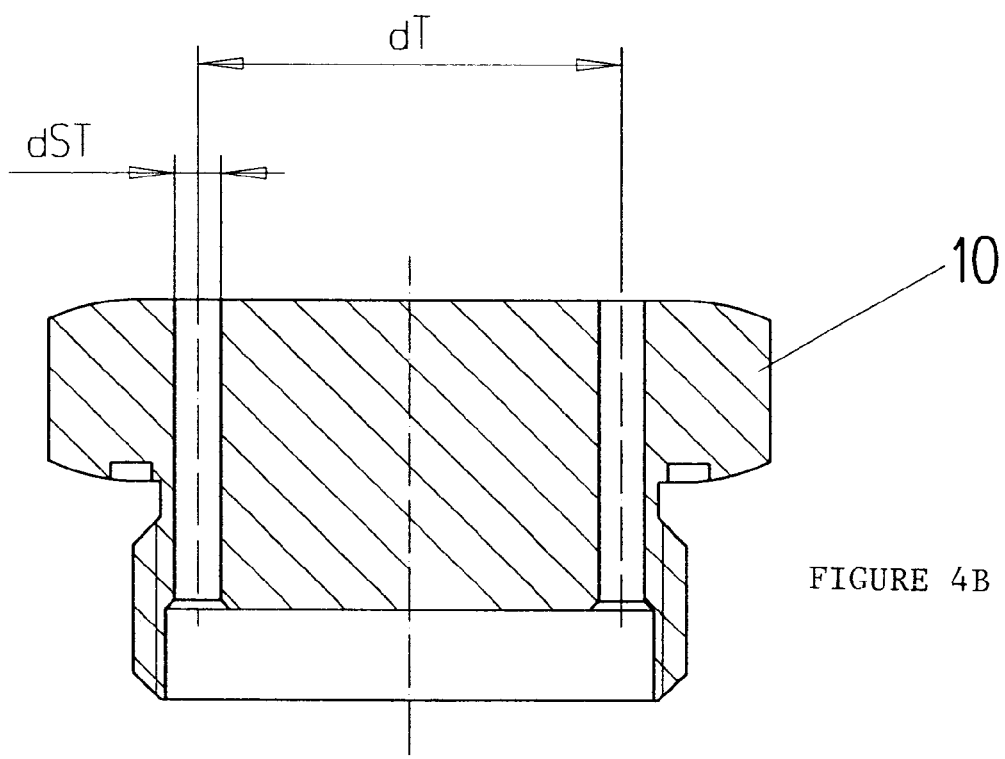
FIG. 4B is a front elevational view, partially cut away, of FIG. 4A.

As shown in FIG. 6, the upper V-shaped row consists of 5 jet-spraying nozzles (10) (FIGS. 4A and 4B). The second V-shaped row does not have a bottom jet-spraying nozzle (10) in its center, but includes two jet-spraying nozzles (10) (FIGS. 4A and 4B) on the sides below the outer gaps between pairs of adjacent jetspraying nozzles (10) of the top V-row, and further includes two shroud-spraying nozzles (11) located farther outside. A third row is arranged below the second row with one bottom jet-spraying nozzle (10) (FIGS. 5A and 5B) and a pair of shroud-spraying nozzles (11) on the far outside limiting the entire arrangement.

As is depicted generally in FIGS. 4A and 4B, the jet spraying nozzle (10) is designed with a plurality of spray holes, preferably 10–16 in number, having a diameter of 2–3 millimeters and being disposed along a circle having a diameter of 10–16 millimeters and a pitch diameter of 10–28 millimeters.

Figure 5A:
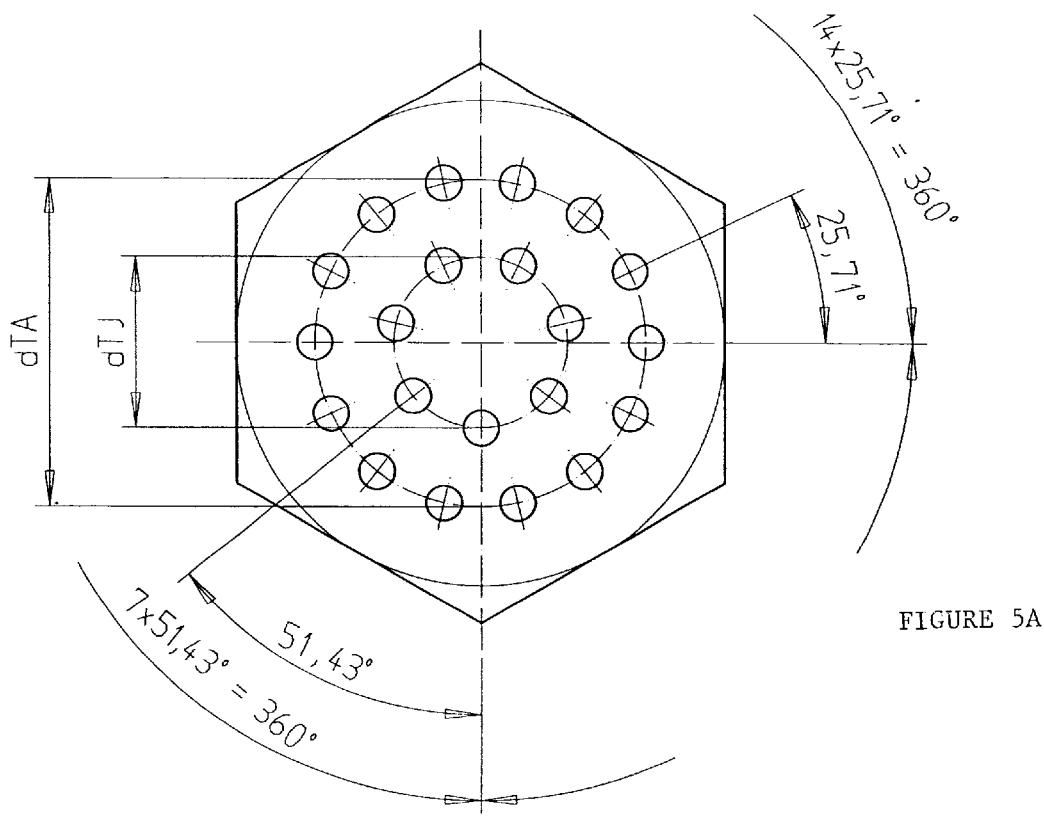
FIG. 5A is a top plan view of a second type of jet-spraying nozzle in accordance with the present invention.
Figure 5B:
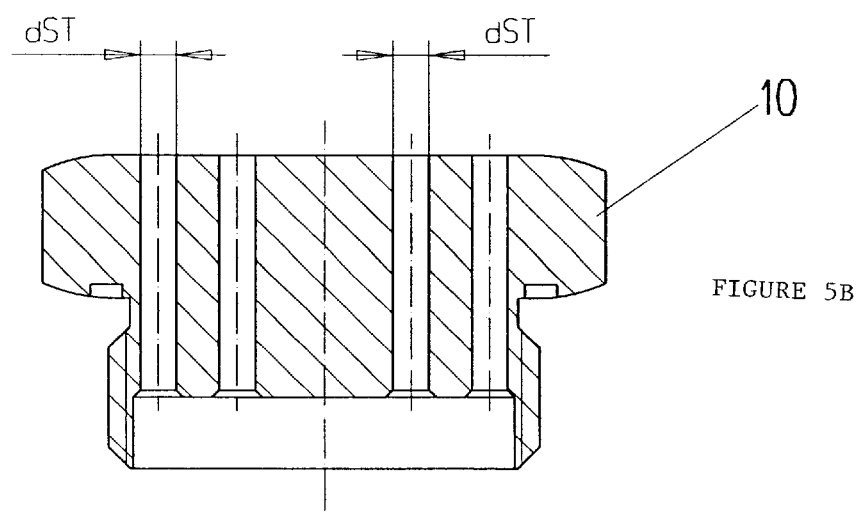
FIG. 5B is a front elevational view, partially cut away, of FIG. 5A.

As is depicted generally in FIGS. 5A and 5B, the jet-spraying nozzle (10) is designed with two concentric circles of spraying holes to produce the strongest jet possible. Each of these spraying holes is 2–3 millimeters in diameter. The outer circle has a diameter of 10–16 millimeters and the inner circle has a diameter of 5–9 millimeters. The spraying holes are arranged in a staggered manner by half a pitch. The pitch circle diameters are 6–15 millimeters at the inside and 10–28 millimeters at the outside. Jet-spraying nozzles (10) having a spraying hole diameter of 2.5 mm, with 14 holes on an outer pitch circle 23 mm in diameter and with 7 holes on an inner pitch circle 12 mm in diameter have been showing the most favorable results.

With the given effectiveness of the small size of the described nozzle assemblies and the marginal spreading of the spraying jets of water, it is favorably possible to arrange the nozzle assemblies (9) on both sides underneath a broad piece, i.e., a slab, in alignment with the cutting line and facing generally towards each other. The nozzle assemblies (9) are each turned horizontally at different directions at only a small angle with respect to a right angle to the material whereby they jetspraying nozzles (10) are spraying substantially parallel. The nozzle assemblies are further oriented such that the water jets are pointing horizontally to slightly downward.

The supply of pressurized water to a granulation system of the torch cutting machine (1) from both sides thereof is more expensive and requires more maintenance efforts than the supply from only one side thereof by means of a pressure water pipe, which is arranged in front of the torch cutting machine (1) and its cutting torches (2) and which carries one granulation equipment (4) including a nozzle assembly (9) each on both sides.

According to the invention, an independent water supply to each granulation equipment (4) per side of the granulation system is possible from one side of the torch cutting machine (1) with an individual shut-off (7) and adjusting device (8), not only via a double-pipe, but via a main supporting pipe (5) configured with a closure at its midsection for the supply on the inlet side, and an auxiliary pipe (6) which bypasses the closure. This auxiliary pipe (6) then discharges into the supporting pipe past the closure for the supply of the other granulation equipment (4) on the other side.

Figure 7:
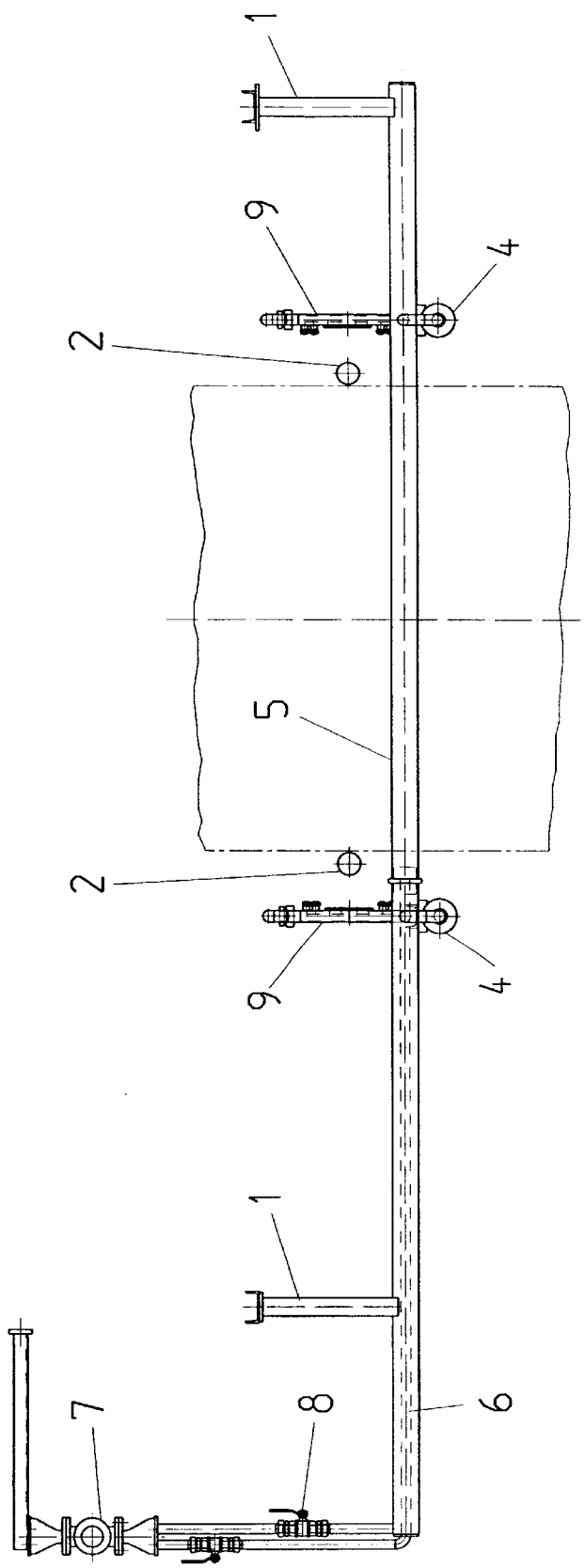
FIG. 7 is a top plan view of a torch cutting machine in accordance with the present invention.

This favorable design is depicted in FIG. 7.

While a particular embodiment of the present invention has been described herein, it is understood that various changes, additions, modifications, and adaptations may be made without departing from the scope of the present invention, as set forth in the following Claims.

I claim:

1. A nozzle assembly for use in a torch cutting machine employed in a steel strand casting operation, the nozzle assembly comprising:
   a nozzle body;
   a plurality of jet-spraying nozzles, each jet-spraying nozzle being formed with a plurality of spraying holes;
   a plurality of shroud-spraying nozzles;
   the jet-spraying and shroud-spraying nozzles being mounted on the nozzle body and arranged in at least a first substantially V-shaped row on the nozzle body; and
   the jet-spraying and shroud-spraying nozzles being structured to receive a quantity of granulation water at a controlled pressure and to deliver the quantity of granulation water therethrough at a controlled flow rate to form a multiple-level curtain of water.

2. The nozzle assembly as set forth in claim 1, in which the nozzle assembly includes three jet-spraying nozzles positioned between two shroudspraying nozzles within the at least first row, the nozzle body being oriented such that the two shroud-spraying nozzles are disposed vertically higher than the three jet-spraying nozzles.

3. The nozzle assembly as set forth in claim 2, in which the narrowest central distances between adjacent jet-spraying and shroud-spraying nozzles is from 30 to 60 millimeters.

4. The nozzle assembly as set forth in claim 2, in which the nozzle body is a horizontal pipe.

5. The nozzle assembly as set forth in claim 1, in which spraying holes of the jet-spraying nozzles are disposed along at least a first circle.

6. The nozzle assembly as set forth in claim 5, in which the spraying holes of at least one of the jet-spraying nozzles are formed along a second circle that is concentric with the at least first circle, the spraying holes formed along the second circle being staggered with respect to the spraying holes disposed along the at least first circle.

7. The nozzle assembly as set forth in claim 1, in which the jet-spraying and shroud-spraying nozzles are disposed along a second substantially V-shaped row and a third substantially V-shaped row, the at least first, second, and third rows being at least partially aligned with one another.

8. The nozzle assembly as set forth in claim 7, in which the at least first row includes five jet-spraying nozzles, the second row includes two jet-spraying nozzles and two shroud-spraying nozzles, and the third row includes one jetspraying nozzle and two shroud-spraying nozzles.

9. The nozzle assembly as set forth in claim 8, in which the spraying holes of the jet-spraying nozzles are disposed along at least a first circle, and in which the spraying holes of at least one of the jet-spraying nozzles are formed along a second circle that is concentric with the at least first circle, the spraying holes formed along the second circle being staggered with respect to the spraying holes disposed along the at least first circle.

10. The nozzle assembly as set forth in claim 8, in which the jet-spraying nozzles of the second and third rows are positioned within the second and third rows between the shroud-spraying nozzles.

11. The nozzle assembly as set forth in claim 1, in which the controlled pressure is from 3 to 9 bar and the controlled flow rate is from 30 to 60 cubic meters per hour.

12. A granulation system for granulating molten particles produced in cutting a steel strand with a torch cutting machine in a continuous casting operation, the granulation system comprising:

a main supporting pipe;

an auxiliary pipe;

a pair of nozzle assemblies mounted on the main supporting pipe;

each nozzle assembly including a nozzle body, a plurality of jet-spraying nozzles, and a plurality of shroud-spraying nozzles, each jet-spraying nozzle being formed with a plurality of spraying holes, the jet-spraying and shroud-spraying nozzles being mounted on the nozzle body and arranged in at least a first substantially V-shaped row on the nozzle body;

the nozzle assemblies each being structured to receive a quantity of granulation water at a controlled pressure and to deliver the quantity of granulation water therethrough at a controlled flow rate to each form a multiple-level curtain of water; and the main supporting pipe having a first end and a second end and being structured to deliver from the first end the quantities of water to each nozzle assembly.

13. The granulation system as set forth in claim 12, in which the main supporting pipe is formed with a closure between the first and second ends, the main supporting pipe being structured to receive therethrough from the first end the quantity of water for delivery to one of the pair of nozzle assemblies, and in which the auxiliary pipe extends from and bypasses the first end of the main supporting pipe and is in fluid communication with the main supporting pipe between the closure and the second end, the auxiliary pipe being structured to receive therethrough the quantity of water for delivery to the other of the pair of nozzle assemblies.

14. The granulation system as set forth in claim 12, in which each nozzle assembly includes three jet-spraying nozzles positioned between two shroud-spraying nozzles within the at least first row, the nozzle body being oriented such that the two shroud-spraying nozzles are disposed vertically higher than the three jet-spraying nozzles.

15. The granulation system as set forth in claim 12, in which each nozzle assembly includes jet-spraying and shroud-spraying nozzles are disposed along a second substantially V-shaped row and a third substantially V-shaped row, the at least first, second, and third rows being at least partially aligned with one another, the at least first row including five jet-spraying nozzles, the second row including two jet-spraying nozzles and two shroud-spraying nozzles, and the third row including one jet-spraying nozzle and two shroud-spraying nozzles.

16. The granulation system as set forth in claim 12, in which the nozzle assemblies are oriented on the main support pipe such that the jet-spraying nozzles are pointed at an angle of from 0–5 degrees with respect to the horizontal, the nozzle assemblies being disposed on alternate sides of the strand and each being turned within an imaginary horizontal plane at a given angle in different directions with respect to the strand such that the jet-spraying nozzles of one of the pair of nozzle assemblies are pointed in a direction substantially parallel with the direction pointed by the jet-spraying nozzles of the other of the pair of nozzle assemblies, the given angle being from 0–15 degrees with respect to a right angle from the strand.

17. The granulation system as set forth in claim 12, in which the spraying holes of each of the jet-spraying nozzles are formed along at least a first circle, and in which the spraying holes of at least one of the jet-spraying nozzles of each of the pair of nozzle assemblies are formed along a second circle that is concentric with the at least first circle, the spraying holes formed along the second circles being staggered with respect to the spraying holes disposed along the at least first circles.

18. The granulation system as set forth in claim 17, in which the spraying holes are from 2–3 millimeters in diameter, in which the at least first circle is from 10–16 millimeters in diameter, in which the second circle is from 5–9 millimeters in diameter, and in which the narrowest central distances between adjacent jet-spraying and shroud-spraying nozzles is from 30–60 millimeters.

19. The nozzle assembly as set forth in claim 12, in which the controlled pressure is from 3 to 9 bar and the controlled flow rate is from 30 to 60 cubic meters per hour.

* * * * *